United States Patent
Scheibel

[15] 3,707,327
[45] Dec. 26, 1972

[54] MAGNIFIER WITH OPTICAL CONTRAST EQUALIZER

[72] Inventor: Josef Scheibel, Ober-Morlen, Germany

[73] Assignee: Braun A.G., Frankfurt/Main, Germany

[22] Filed: Aug. 5, 1970

[21] Appl. No.: 61,103

[30] Foreign Application Priority Data

Aug. 16, 1969 Germany..................P 19 41 804.3

[52] U.S. Cl. ..................355/71, 240/41.37, 240/44.1
[51] Int. Cl.......G03b 27/16, G03b 27/76, F21v 7/00
[58] Field of Search................355/55, 63, 67, 69, 71; 240/20, 41.1, 41.37, 44.1

[56] References Cited

UNITED STATES PATENTS 1,633,228  6/1927  Rogers ..................................355/67
3,227,039  1/1966  Simmon............................355/69 X Primary Examiner—Joseph F. Peters, Jr.
Attorney—Ernest F. Marmorek

[57] ABSTRACT

A magnifying apparatus having a projection lamp with a preferably small filament, a concave reflector mounted for movement along the optical axis of the apparatus, a transparent medium mounted in the path of the light rays produced by the projection lamp, the concave reflector forming an image of the filament on the transparent medium which image serves as the effective light source, the planar expansion of the effective light source is adjustable by the axial adjustment of the concave reflector in a continuous fashion.

5 Claims, 1 Drawing Figure

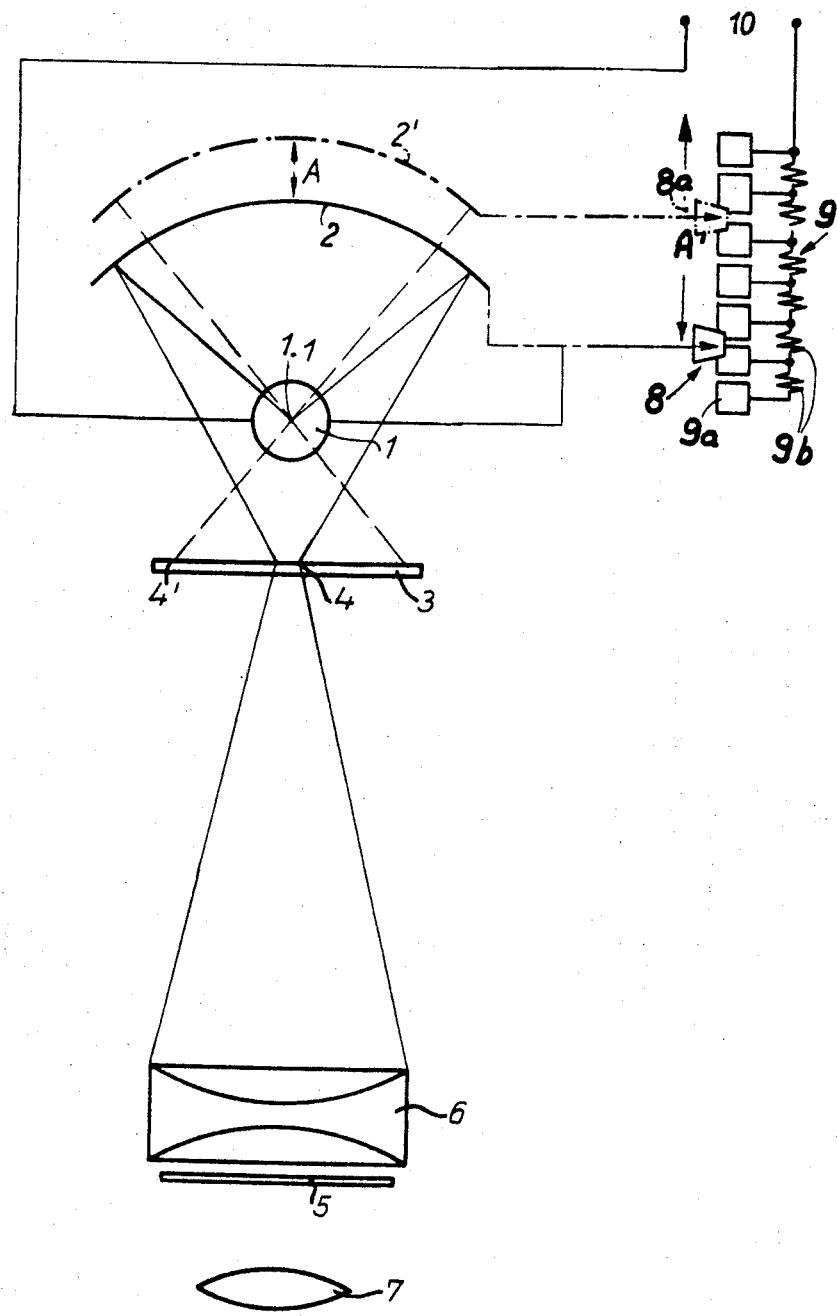

MAGNIFIER WITH OPTICAL CONTRAST EQUALIZER

FIELD OF THE INVENTION

The present invention relates to a magnifying apparatus having optical contrast correction means therein and an illuminating unit with a projection lamp provided with a preferably small filament.

BACKGROUND OF THE INVENTION

In the hitherto known magnifying devices a change of the image contrast is performed by a variety of means. In the relatively simple magnifying devices it is common to correct the contract by changing the illuminating condenser, (a double condenser for harder reproduction, and a simpler condenser for softer reproduction) or by the introduction of diffusors into the path of the illuminating ray.

Somewhat more effort is required by devices in which the contrast correction is made by the selective insertion of different light sources, such as, cold light producing sources having large surfaces, illuminating sources using the Ulbricht-sphere-type photometer system, opalized incandescent lamps, projection lamps, etc. Such devices permit a very versatile change of the image contrast due to their universal applicability. With such devices a great variety of reproduction of the negative being enlarged can be performed.

In all the above discussed cases the image contrast depends from the planar expansion of the effective light source.

The known magnifying devices having optical contrast correction suffer also from the disadvantage that each time the illuminating unit is changed, there is a corresponding change in the illuminating intensity with which the picture under enlargement is projected onto the magnifying plane. In order to attain a uniform illumination of the magnification but different contrast contents of the same negative, so far exact measurements of the light intensity of the light source employed were necessary and the results of such measurements had to be considered in calculating the exposure time to which the apparatus had to be set.

SUMMARY OF THE INVENTION

It is an object of the present invention to provide means for the continuous adjustment of the planar expansion of the effective light source in a magnifier and thereby to obtain a contrast correction for each paper grade without intermediate manipulation, such as, the change of the illuminating unit, etc.

In accordance with the above object the invention provides a magnifying apparatus in which a concave reflector which is adjustable along the optical axis of the apparatus and which cooperates with the lighting unit and forms an image of the filament of the projection lamp on a transparent medium in a manner that the planar expansion of this image, which in itself is the effective light source, can be continuously adjusted by the axial shifting of the concave reflector.

As a result, by the simple shifting of the concave reflector in the axial direction accompanied by a change in the magnitude of the filament image, the contrast content of the projected picture can be adjusted within wide limits.

In order to eliminate the above noted disadvantage involving the preliminary measurements, the magnifying apparatus according to the present invention is provided with means which along with the adjustment of the concave reflector cause necessarily an adjustment of the operating voltage of the projection lamp in such a manner that the illuminating intensity of the image of the negative in the magnifying plane depending always from the changes in the planar expansion becomes compensated by a corresponding change of the operating voltage of the projection lamp and is, thereby, controlled by the aforementioned changes in the planar expansion of the effective light source.

As a result, the magnifying apparatus according to the present invention is capable of sustaining a uniform illuminating intensity with which the negative onto the magnifying plane is projected by employing a simple contrast correction corresponding to the paper grade being used in each case.

The invention will become more readily apparent from the following description of a preferred embodiment thereof shown, by way of example, in the accompanying drawing, by which:

The single figure is a schematic representation of the magnifying device according to the present invention.

DESCRIPTION OF THE PREFERRED EMBODIMENT

With reference to the single FIGURE it is seen that the magnifying apparatus according to the present invention comprises an illuminating unit in the form of a fixedly mounted projection lamp 1 having a filament 1.1 which for the sake of simplified illustration has been shown as a point source on the drawing. The illuminating unit further includes a concave mirror or reflector 2 which can be shifted or moved in the direction along the optical axis and which forms an image of the filament 1.1 on a transparent medium, such as a light-dispersing glass plate 3, having parallel plane surfaces, or on an opaque screen. The planar expansion of this image can be varied from a minimum to a maximum, determined by the dimensions of the optical members of the illuminating unit, by simply shifting the concave reflector 2 axially. The limits of the light rays which form the smallest image 4 of the filament 1.1 on the glass plate 3 are shown on the drawing by solid lines while the limits of the light rays which form the maximum image 4' of the filament 1.1 are shown by dashed lines on the drawing. The relatively large range of variation is attained by the shifting of the reflecting mirror 2 in the direction of the arrow A from its original position illustrated by solid lines into or towards its other limit position shown by the dashed line and identified by 2'.

The image of the filament 1.1 of the projection lamp 1 on the transparent glass plate 3 forms the effective light source for the projection or illumination of the negative 5 under enlargement. Where the effective light source extends through only a small size area, as indicated at 4, the negative 5 preferably should be illuminated by means of a strongly coherent light beam through a double condenser 6, and this will result in an enlarged reproduction, of the negative, rich in contrasts, that is, as a result of the relatively strong coherence of the illustrated light rays the light source 4 becomes approximately a point source.

In the event that the effective light source has a relatively large planar expansion which is identified by 4' on the drawing then the illumination of the negative 5 is effected by a broad light ray which produces a more dispersed light which, as a result of the relatively large light surface, strongly reduces the contrast content of the negative projected onto the magnifying plane. The negative 5 which has been illuminated by the light rays produced is imaged by means of the projection optics 7 onto the magnifying plane of the apparatus, such magnifying plane not being shown on the drawing.

In order to compensate for the changes in the illuminating intensity with which the negative onto the magnifying plane is projected and which is due to the changed of the effective light source and of the filament image formed on the glass plate 3, the concave mirror 2 is functionally coupled with a wiper arm 8 of a resistor 9 connected into the energizing circuit of the projection lamp 1. The resistor 9 comprises a plurality of contacts 9a which are adapted to be bridged by the wiper arm 8, each of the contacts 9a are joined by resistive portions 9b of the resistor 9.

In the event when the concave mirror 2 is in its position illustrated by the solid line and in which the filament 1.1 of the projection lamp 1 is imaged on the glass plate 3 by a strong coherent light ray, the wiper arm 8 connects a relatively large portion of resistor 9 into the energizing circuit of the lamp supplied by the power source 10.

In the event, however, that the concave mirror 2 is in its position illustrated by the dashed line 2' or it is being shifted towards such position, then in order to correct for the resulting strong increase of the filament image on the glass plate 3, the wiper arm 8 will be moved along the path A' by the mirror 2 into position 8a illustrated by the dashed line, whereupon the effective portion of the resistor 9 connected into the energizing circuit of the lamp becomes continuously reduced. As a result, the operating voltage of the projection lamp 1 becomes continuously increased. The increasing intensity of the lamp equals to the drop in the light intensity of the effective light source resulting in an increase in the planar expansion from size 4 to size 4'.

The above described compensation permits a change of the image contrast without manually correcting the illuminating intensity while the same negative is being projected onto the magnifying plane of the apparatus with different contrast content.

From the above, it is apparent that although the invention has been described hereinbefore with respect to a certain specific embodiment thereof, it is evident that many modifications and changes may be made without departing from the spirit of the invention. Accordingly, by the appended claims, we intend to cover all such modifications and changes as fall within the true spirit and scope of this invention.

I claim:

1. A magnifying apparatus comprising a projection lamp having preferably a small filament, a concave reflector means mounted for movement along the optical axis of the apparatus, a light dispersing transparent medium mounted in the path of the light rays produced by said projection lamp and at a predetermined fixed axial distance from said lamp, said concave reflector means forming an image of said filament on said transparent medium, said image serving as the effective light source, means operable for adjusting the planar expansion of said effective light source by affecting the axial adjustment of said concave reflector means in a continuous fashion.

2. The magnifying apparatus as claimed in claim 1, wherein said transparent medium for the forming of said effective light source comprises a dispersion glass.

3. The magnifying apparatus as claimed in claim 1, further including means operatively coupled to said concave reflector means for adjusting the operating voltage of said projection lamp, whereby each change of the illuminating intensity of the image with which the negative is projected into the magnifying plane of said apparatus and depending from the planar expansion of said effective light source is accompanied by a corresponding change in the operating voltage of the projection lamp.

4. The magnifying apparatus as claimed in claim 3, wherein said last mentioned means comprises a variable resistor means, a current source and an energizing circuit for said projection lamp, said variable resistor being connected into said energizing circuit.

5. The magnifying apparatus as claimed in claim 3, wherein said last-mentioned means for adjusting the operating voltage of said projection lamp comprises step switch means operatively coupled to said concave reflector means, an energizing circuit for said projection lamp including a source of operating voltage supply, a plurality of resistors connected into said energizing circuits and coupled to said stepped switch means for variably adjusting the current flowing in said energizing circuit to said projection lamp.

* * * * *